Patented Sept. 21, 1937

2,093,462

UNITED STATES PATENT OFFICE 2,093,462

CELLULOSE ESTERS CONTAINING DICARBOXYLIC ACID GROUPS AND PROCESS OF MAKING THE SAME

Carl J. Malm and Charles E. Waring, Rochester, N. Y., assignors, by mesne assignments, to Eastman Kodak Company, Jersey City, N. J., a corporation of New Jersey No Drawing. Application July 22, 1929, Serial No. 380,252

39 Claims. (Cl. 260—101)

This invention relates to dicarboxylic acid esters of cellulose and particularly the phthalic and succinic esters of cellulose and a process for the preparation of such esters.

The dicarboxylic esters of cellulose were first mentioned in the "Journal of Industrial and Engineering Chemistry" August 1920, page 743 in an article by H. A. Levey on "Cellulose Phthalate: Its Preparation and Properties." In this method of preparation, modified cellulose was alleged to have been treated with phthalic anhydride and fused zinc chloride as a catalyst, at a temperature of 70° C. for 24 hours. The product which he obtained was not soluble in any of the usual cellulose ester solvents. He stated that upon analysis he found that "One molecule of phthalic acid combined with 8 molecules of cellulose ($C_6H_{10}O_5$)."

In United States Patent 1,704,306, Ray L. Stinchfield, March 5, 1929, a method for esterifying cellulose with phthalic groups is likewise disclosed. In this process, however, it was found necessary, in order to effect the esterification, to "inactivate" one of the carboxyl groups of the phthalic acid, say by esterifying it. The cellulose was then treated with this already partly-esterified phthalic acid and a chlorinated fatty acid anhydride; which attached the free carboxyl group of the phthalic acid to the cellulose molecule thereby obtaining for example an ethyl phthalic ester.

One object of our invention is to provide a process of preparing dicarboxylic acid esters of cellulose in which one of the carboxyl groups of the dicarboxylic acid radicals is unesterified. Another object of our invention is to provide a process of esterifying cellulosic material which may result in a cellulose derivative having from 12% up to the maximum content of dicarboxylic acid radical possible. It is to be understood that where the cellulosic material used as the starting material is a cellulose derivative which contains but a small proportion of esterifiable hydroxyl groups, the amount of dicarboxylic acid radicals introduced must necessarily be less than 12% but the ester nonetheless has the maximum content of dicarboxylic acid radical possible. A further object of our invention, therefore, is to prepare dicarboxylic acid esters of esterifiable cellulose derivatives. A still further object is to provide a method of making dicarboxylic acid esters of cellulose in which one of the carboxyl groups may be either uncombined or combined with a base.

We have found that cellulose esters of dicarboxylic acids can readily be formed by treating cellulose or cellulosic materials with a dicarboxylic acid anhydride in the presence of an organic base. By our method, the cellulose is esterified with only one of the two carboxyl groups; while the other carboxyl group during the reaction combines with the organic base from which it can later be freed by treating the resulting compound with a stronger acid.

In contradistinction then, to the above disclosed art, we have been able to combine with the cellulose, by treatment with the anhydride and an organic base, up to three molecules of combined dicarboxylic acid for every ($C_6H_{10}O_5$).

In preparing these esters we have found it possible to start with cellulose, for example cotton fibers, paper, or any customary types of purified cellulose material. As in the acetylation of cellulose the esterification of the unmodified cellulosic material is more or less tedious, a completely esterified cellulose phthalate using unmodified cellulose as the starting material requires about a week at 60–65° C. The time for carrying out the reaction can be considerably decreased if the reaction is carried out at higher temperatures or pretreated cellulose is employed as a starting material. For example, cellulose which has been treated by any of the well known processes for the preparation of cellulose for acetylation can be rapidly converted into a dicarboxyl ester by our process. If it be desired to obtain a mixed ester, a cellulose partly acetylated in a manner such as is described in United States Patent 1,668,944, Clarke and Malm, May 8, 1928, or a partially hydrolized cellulose triacetate may be used as a starting material. Other esters or even cellulose ethers may be esterified by our process.

The dicarboxylic acids which we have found suitable include alkyl as well as aryl dicarboxylic acids. While we have found succinic acid suitable for our purpose, due to its availability, homologues, such for example as glutaric acid, may be used. Among the aryl dicarboxylic acids, phthalic acid, which at the present time is available at a moderate cost, is especially suitable; while other aryl dicarboxylic acids having similar chemical properties may be employed.

In order that the esterification be carried on smoothly, it is desirable that an organic base be present in the reacting solution: pyridine, quinoline, and other salt-forming bases of this group have proven very advantageous.

As stated above, the time of the reaction is governed to a great extent by the type of cellulosic material used. Generally, we have found it desirable to carry on the reaction at a temperature below approximately 95° C., but it will be understood that higher or lower temperatures may be used, in the former case the reaction being accelerated and in the latter retarded. The temperature should be kept sufficiently low to insure that a product will not be obtained the properties of which have been markedly affected by the degradation of the cellulose nucleus. At a temperature of 60–65° C., using cellulose unmodified as starting material, the time of reaction may take up to as long as two or more weeks; while with a cellulose ether containing about 35% ethoxy the time of acylation is cut down to 24 hours. It is, therefore, seen that the rate of the reaction is also governed by the physical and/or chemical condition of the original cellulose used in the reaction.

On the completion of the esterification, or when the required degree of esterification has occurred, which may be determined by removal of a portion of the material from the esterifying bath and analyzing it for combined dicarboxylic acid, the whole reaction mass is precipitated in a nonsolvent of the ester which has been formed. For example, cellulose phthalate containing approximately 74% phthalyl may be precipitated in methyl alcohol and carefully washed with methyl alcohol until the products of the reaction have been thoroughly removed from the compound. To those familiar with the art of cellulose ester manufacture, numerous non-solvent equivalents similar to methyl alcohol will suggest themselves; the washing, of course being done with a nonsolvent of the ester, but solvent for the reagents, care being taken that this nonsolvent does not deleteriously affect the use to which the ester is to be put.

The products which are obtained by our process are generally all soluble in water containing small quantities of pyridine. They are also soluble in mixtures of pyridine and benzene, pyridine and tetrachloroethane, pyridine and ethylene chloride, and similar solvent mixtures containing with the pyridine a solvent or nonsolvent of the compound. From solutions of the ester in the above solvents, transparent flexible films of the cellulose ester may be formed by spreading on a film-forming surface, such as a polished drum, and coagulated or solidified in a fluid stream of heated air or a nonsolvent liquid.

The following examples give specific illustrations of the manner in which our esterifying process may be conducted, but of course it will be understood that we shall not be limited thereby, except as indicated in the appended claims.

Example 1.—Ten grams of cellulose, for example tissue paper, is treated with a mixture of 50 grams of phthalic anhydride and 200 cc. of pyridine, in a suitable jacketed container, the temperature of the reaction being maintained at 60–65° C. The material forms a very heavy viscous dope in about two weeks; by precipitating this material in methyl alcohol and carefully washing with methyl alcohol a cellulose pyridine phthalate is obtained which contains approximately 50% phthalyl. Theoretically, cellulose triphthalate contains 73.5% phthalyl.

Example 2.—Five grams of cellulose may be treated with 25 grams of succinic anhydride in 75 cc. of pyridine at 60–65° C. The reaction in this case is somewhat more rapid than that described in Example 1, and a dope is formed in about one week. This dope may then be precipitated in methyl alcohol and washed and dried as above. The resulting cellulose pyridine succinate contains approximately 62% succinyl. Theoretically, a fully esterified cellulose trisuccinate contains 65% succinyl.

Example 3.—If 2½ grams cuprammonium silk are boiled in acetic acid for a period of 10 days, the modified cellulose will contain approximately 15% acetyl. This material may then be treated with 10 grams of phthalic anhydride dissolved in 50 cc. of pyridine and after two days at a temperature of 60–65° C. it may be precipitated in dilute acetic acid and washed by the same solution. After drying, this mixed cellulose acetate-phthalate will contain approximately 54% phthalyl.

Example 4.—Ten grams of cellulose acetate containing approximately 39% acetyl, that is a cellulose acetate of the acetone soluble variety, is dissolved in 55 cc. of pyridine containing 10 grams of phthalic anhydride and kept in a jacketed kettle at 60–65° C. for about 4 days. The cellulose acetate pyridine phthalate after precipitation in methyl alcohol and the usual washing and drying shows on analysis approximately 21% phthalyl.

Example 5.—Two grams of cellulose acetate which have been hydrolyzed to approximately 36% acetyl, if treated with a solution of 10 grams of phthalic anhydride and 7 cc. of pyridine in 50 cc. of benzene for 20 hours at 60–65° C. and then precipitated in methyl alcohol, results in a cellulose acetate pyridine phthalate containing in the neighborhood of 30% phthalyl.

Example 6.—Ten grams of cellulose ethyl-ether containing about 35% ethoxyl after treatment for 24 hours in a solvent mixture containing 50 cc. of pyridine to which has been added 15 grams of phthalic anhydride, this reaction being conducted at 60–65° C., the resulting material being precipitated in dilute acetic acid, washed and dried, results in an ethyl cellulose phthalate containing 16.5% phthalyl.

Example 7.—Five grams of cellulose acetate containing 37% of acetyl was added to a mixture of 50 grams of phthalic anhydride, 50 grams of tetrachloroethane, and 25 grams of quinoline. This mixture was kept for 60 hours at 95° C. At the end of this time the dope was precipitated into methyl alcohol, and the precipitate washed well and dried. The resulting cellulose acetate quinoline phthalate was found to contain about 20% of phthalyl.

Example 8.—Five grams of cellulose acetate containing 37% acetyl was added to a mixture of 50 grams of phthalic anhydride, 50 grams of tetrachloroethane, and 25 grams of dimethylaniline. The reaction was carried out in exactly the same way as described in Example 7. The resulting cellulose dimethylaniline phthalate contained 18% of combined phthalyl.

Example 9.—Five grams of cellulose was added to a mixture of 50 grams of phthalic anhydride and 100 grams of pyridine, and the mixture was kept at 95° C. for 24 hours when a smooth dope was obtained. This was precipitated into alcohol and washed with alcohol and finally with ether. The resulting cellulose pyridine phthalate contains 72% of combined phthalyl.

These dicarboxylic acid esters of cellulose, or the cellulose esters containing acetyl or ethoxy groups together with the dicarboxylic acid radical obtained in the above examples, are likewise combined with pyridine. One of the carboxyl groups of the dicarboxylic acid has esterified, we believe, with the cellulose molecule, while the other carboxyl group has combined with the pyridine. While the ester containing the pyridine may have properties fitting it for particular uses, we find it desirable to treat the pyridine-containing esters obtained in the above processes with an excess of an acid having an ionization constant greater than the ionization constant of the second carboxyl group of the acid corresponding to the dicarboxylic acid anhydride which was used in the esterifying solution. This acid frees the cellulose dicarboxylic acid ester from the combined pyridine. For example, if a phthalic ester has been formed, an excess of acetic acid over and above that required to combine with the pyridine will remove the pyridine from the ester. Mineral acids also are suitable for this purpose such as sulfuric acid, hydrochloric acid, etc.

If desired, the carboxyl group, which has been restored by freeing the ester from the pyridine as described above, may be treated with organic or inorganic bases whereby a series of new compounds can be made. For example, by treating cellulose phthalate, from which the pyridine has been removed, with sodium hydroxide, cellulose sodium phthalate will be obtained which is water soluble. Countless similar compounds of these esters may thereby be formed which readily suggest themselves to those familiar with the art.

Various changes may be made in the methods described for carrying out our process, such for example as in the type of dicarboxylic acid anhydride used, or of the organic base which is employed to react with the free carboxyl group of the acid, without in any way departing from the scope of this invention or sacrificing any of the benefits that may be derived therefrom. By our method, esters may readily be obtained having any desired degree of acylation to the maximum acylation possible, which in each case will be determined by the type of dicarboxylic acid anhydride employed.

Where the term "cellulosic material" is employed herein, it refers to either cellulose or a cellulose derivative such as a cellulose ester or a cellulose ether, containing esterifiable hydroxyl groups.

Having thus described our invention, what we claim as new and desire to secure by Letters Patent is:

1. Cellulose acetate phthalate.
2. Cellulose acetate pyridine phthalate.
3. A cellulose dicarboxylic acid ester containing at least 12 molecular per cent of a dicarboxylic acid radical, one carboxyl of which is unesterified.
4. A phthalate of a cellulose ether.
5. A process for making cellulosic dicarboxylic acid esters which comprises esterifying cellulosic material with a dicarboxylic acid anhydride in the presence of pyridine.
6. A process for making cellulosic dicarboxylic acid esters which comprises esterifying cellulosic material with a dicarboxylic acid anhydride in the presence of a tertiary base and treating the resulting product with a stronger acid than that corresponding to the mono-cellulose ester of the dicarboxylic acid.
7. A process of making cellulose mixed esters which comprises treating an esterifiable cellulose acetate with a dicarboxylic acid anhydride in the presence of a tertiary base.
8. A process for making cellulose acetate-phthalate which comprises treating cellulose acetate with phthalic acid anhydride in the presence of pyridine.
9. A process for making a cellulose acetate-phthalate which comprises treating cellulose acetate with phthalic acid anhydride in the presence of pyridine and benzene.
10. A process of making a phthalate of a cellulose ethyl-ether which comprises treating cellulose ethyl-ether with phthalic acid anhydride in the presence of pyridine.
11. A process of making cellulosic dicarboxylic acid esters which comprises esterifying a cellulosic material with a dicarboxylic acid anhydride in the presence of a tertiary base, freeing the resulting ester from the organic base by treatment with a strong acid and reacting upon substantially all of the thus freed carboxyl groups of the ester with a base having an ionization constant of not less than $1 \times 10^{-9}$ at 25° C.
12. A process of making dicarboxylic acid esters of cellulose which comprises esterifying cellulose with a dicarboxylic acid anhydride in the presence of a tertiary organic base, freeing the resulting ester from the organic base by treatment with a strong acid and reacting upon substantially all of the thus freed carboxyl groups of the ester with a base having an ionization constant of not less than $1 \times 10^{-9}$ at 25° C.
13. A process of making dicarboxylic acid esters of cellulose which comprises esterifying cellulose with a dicarboxylic acid anhydride in the presence of a tertiary organic base, freeing the resulting ester from the organic base by treatment with a strong acid and reacting upon substantially all of the thus freed carboxyl groups of the ester with an hydroxide of an alkali metal.
14. A process for making dicarboxylic acid esters of cellulose which comprises esterifying the cellulose with a dicarboxylic acid anhydride in the presence of pyridine, freeing the resulting ester from pyridine by treatment with a strong acid, and subsequently reacting on the freed ester with a base having an ionization constant of not less than $1 \times 10^{-9}$ at 25° C.
15. A process for making dicarboxylic acid esters of cellulose which comprises esterifying the cellulose with a dicarboxylic acid anhydride in the presence of a tertiary base, freeing the resulting ester from pyridine by treatment with a strong acid, and subsequently reacting on the freed ester with sodium hydroxide.
16. A process for making cellulosic dicarboxylic acid esters, which comprises esterifying cellulosic material with a dicarboxylic acid anhydride in the presence of a tertiary organic base.
17. A process for making cellulose mixed esters, which comprises esterifying a cellulose ester having free and esterifiable hydroxyl groups with a dicarboxylic acid anhydride in the presence of a tertiary organic base.
18. A process for making cellulosic dicarboxylic acid esters, which comprises esterifying an esterifiable cellulose ether with a dicarboxylic acid anhydride in the presence of a tertiary organic base.
19. The process of making alkali-soluble dicarboxylic acid esters of cellulose, which comprises heating a compound containing the cellulose radical $C_6H_7O_2$ and an OH group with the anhydride of a dicarboxylic acid in the presence of pyridine until the product is alkali-soluble.
20. An alkali-soluble phthalic ester of cellulose.
21. An alkali-soluble dicarboxylic acid ester of cellulose.
22. The process of making alkali-soluble dicarboxylic acid esters of cellulose, which comprises heating a compound containing the cellulose radical $C_6H_7O_2$ and an OH group with the anhydride of a dicarboxylic acid in the presence of pyridine until the product is alkali-soluble, then precipitating the cellulose ester by pouring the solution into dilute mineral acid, and washing.

23. The process of making alkali-soluble dicarboxylic acid esters of cellulose acetate which comprises heating a cellulose acetate containing an OH group with the anhydride of a dicarboxylic acid in the presence of a tertiary amine until the product is alkali-soluble.

24. An alkali-soluble dicarboxylic acid ester of cellulose acetate.

25. The process of making alkali-soluble dicarboxylic acid esters of cellulose, which comprises heating a compound containing the cellulose radical $C_6H_7O_2$ and an OH group with the anhydride of a dicarboxylic acid in the presence of a tertiary amine.

26. A dicarboxylic acid ester of a cellulose, organic derivative, one of the carboxyls of the dicarboxylic acid radical being combined with the cellulose unit and the other carboxyl being combined with a base.

27. A phthalic acid ester of a cellulose, derivative, one of the carboxyls of the phthalyl radical being combined with the cellulose unit and the other carboxyl being combined with a base.

28. A dicarboxylic acid ester of cellulose acetate, one of the carboxyls of each dicarboxylic acid radical being unesterified.

29. A dicarboxylic acid ester of cellulose ether.

30. A dicarboxylic acid ester of cellulose, one of the carboxyls of which is combined with the cellulose unit and the other carboxyl is combined with a base.

31. A dicarboxylic acid ester of cellulose, one of the carboxyls of which is combined with the cellulose unit and the other carboxyl is combined with pyridine.

32. An acid dicarboxylic acid ester of cellulose.

33. An acid phthalic ester of cellulose.

34. An acid dicarboxylic acid ester of cellulose acetate.

35. An acid phthalic acid ester of cellulose acetate.

36. The process of making a phthalic ester of cellulose which comprises esterifying cellulosic material with phthalic anhydride in the presence of pyridine.

37. The process of making cellulose acetate phthalate which comprises esterifying cellulose acetate with phthalic anhydride in the presence of a tertiary organic base.

38. The process for making a dicarboxylic acid ester of cellulose acetate which comprises esterifying cellulose acetate with a dicarboxylic acid anhydride in the presence of pyridine.

39. An acid dicarboxylic acid ester of a cellulose derivative.

CARL J. MALM.
CHARLES E. WARING.

---

CERTIFICATE OF CORRECTION.

Patent No. 2,093,462.   September 21, 1937.

CARL J. MALM, ET AL.

It is hereby certified that error appears in the printed specification of the above numbered patent requiring correction as follows: Page 2, second column, line 59, Example 8, after the word "cellulose" insert acetate; page 3, first column, lines 64 and 71, and second column, lines 12 and 46, claims 6, 7, 11 and 15 respectively, after "tertiary" insert organic; and that the said Letters Patent should be read with these corrections therein that the same may conform to the record of the case in the Patent Office.

Signed and sealed this 25th day of January, A. D. 1938.

(Seal)

Henry Van Arsdale,
Acting Commissioner of Patents.

prises heating a compound containing the cellulose radical $C_6H_7O_2$ and an OH group with the anhydride of a dicarboxylic acid in the presence of pyridine until the product is alkali-soluble, then precipitating the cellulose ester by pouring the solution into dilute mineral acid, and washing.

23. The process of making alkali-soluble dicarboxylic acid esters of cellulose acetate which comprises heating a cellulose acetate containing an OH group with the anhydride of a dicarboxylic acid in the presence of a tertiary amine until the product is alkali-soluble.

24. An alkali-soluble dicarboxylic acid ester of cellulose acetate.

25. The process of making alkali-soluble dicarboxylic acid esters of cellulose, which comprises heating a compound containing the cellulose radical $C_6H_7O_2$ and an OH group with the anhydride of a dicarboxylic acid in the presence of a tertiary amine.

26. A dicarboxylic acid ester of a cellulose, organic derivative, one of the carboxyls of the dicarboxylic acid radical being combined with the cellulose unit and the other carboxyl being combined with a base.

27. A phthalic acid ester of a cellulose, derivative, one of the carboxyls of the phthalyl radical being combined with the cellulose unit and the other carboxyl being combined with a base.

28. A dicarboxylic acid ester of cellulose acetate, one of the carboxyls of each dicarboxylic acid radical being unesterified.

29. A dicarboxylic acid ester of cellulose ether.

30. A dicarboxylic acid ester of cellulose, one of the carboxyls of which is combined with the cellulose unit and the other carboxyl is combined with a base.

31. A dicarboxylic acid ester of cellulose, one of the carboxyls of which is combined with the cellulose unit and the other carboxyl is combined with pyridine.

32. An acid dicarboxylic acid ester of cellulose.

33. An acid phthalic ester of cellulose.

34. An acid dicarboxylic acid ester of cellulose acetate.

35. An acid phthalic acid ester of cellulose acetate.

36. The process of making a phthalic ester of cellulose which comprises esterifying cellulosic material with phthalic anhydride in the presence of pyridine.

37. The process of making cellulose acetate phthalate which comprises esterifying cellulose acetate with phthalic anhydride in the presence of a tertiary organic base.

38. The process for making a dicarboxylic acid ester of cellulose acetate which comprises esterifying cellulose acetate with a dicarboxylic acid anhydride in the presence of pyridine.

39. An acid dicarboxylic acid ester of a cellulose derivative.

CARL J. MALM.
CHARLES E. WARING.

CERTIFICATE OF CORRECTION.

Patent No. 2,093,462.

September 21, 1937.

CARL J. MALM, ET AL.

It is hereby certified that error appears in the printed specification of the above numbered patent requiring correction as follows: Page 2, second column, line 59, Example 8, after the word "cellulose" insert acetate; page 3, first column, lines 64 and 71, and second column, lines 12 and 46, claims 6, 7, 11 and 15 respectively, after "tertiary" insert organic; and that the said Letters Patent should be read with these corrections therein that the same may conform to the record of the case in the Patent Office.

Signed and sealed this 25th day of January, A. D. 1938.

(Seal)

Henry Van Arsdale,
Acting Commissioner of Patents.

CERTIFICATE OF CORRECTION.

Patent No. 2,093,462. September 21, 1937.

CARL J. MALM, ET AL.

It is hereby certified that error appears in the printed specification of the above numbered patent requiring correction as follows: Page 2, second column, line 59, Example 8, after the word "cellulose" insert acetate; page 3, first column, lines 64 and 71, and second column, lines 12 and 46, claims 6, 7, 11 and 15 respectively, after "tertiary" insert organic; and that the said Letters Patent should be read with these corrections therein that the same may conform to the record of the case in the Patent Office.

Signed and sealed this 25th day of January, A. D. 1938.

(Seal)

Henry Van Arsdale,
Acting Commissioner of Patents.